(12) United States Patent
Vikman et al.

(10) Patent No.: US 12,018,718 B2
(45) Date of Patent: Jun. 25, 2024

(54) ACTIVE MAGNETIC BEARING APPARATUS

(71) Applicant: Ingersoll-Rand Industrial U.S., Inc., Davidson, NC (US)

(72) Inventors: Esa Heikki Matias Vikman, Espoo (FI); Fredrik Boxberg, Espoo (FI); Juha T. Saari, Espoo (FI); Petri J. Maki-Ontto, Espoo (FI); Lauri Juhani Salmia, Espoo (FI)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 18/115,138

(22) Filed: Feb. 28, 2023

(65) Prior Publication Data

US 2023/0235785 A1  Jul. 27, 2023

Related U.S. Application Data

(63) Continuation of application No. 17/563,324, filed on Dec. 28, 2021, now Pat. No. 11,592,060, which is a
(Continued)

(30) Foreign Application Priority Data

Jan. 21, 2019  (EP) .................................... 19152744

(51) Int. Cl.
*F16C 32/04* (2006.01)
*H02K 7/09* (2006.01)
(Continued)

(52) U.S. Cl.
CPC ...... *F16C 32/0485* (2013.01); *F16C 32/0474* (2013.01); *H02K 7/09* (2013.01);
(Continued)

(58) Field of Classification Search
CPC .............. F16C 32/0485; F16C 32/0474; F16C 32/0446; F16C 2360/44; F16C 2380/26;
(Continued)

(56) References Cited

U.S. PATENT DOCUMENTS 4,180,946 A   1/1980   Heijkenskjold et al.
5,739,609 A   4/1998   Ueyama et al.
(Continued)

FOREIGN PATENT DOCUMENTS

CN   101182865 A   5/2008
CN   102691534 A   9/2012
(Continued)

OTHER PUBLICATIONS

Extended Search Report in European Application No. 19152744.9, dated Jun. 14, 2019.
(Continued)

*Primary Examiner* — Ahmed Elnakib
(74) *Attorney, Agent, or Firm* — Kevin E. West; Advent, LLP

(57) ABSTRACT

An active magnetic bearing apparatus for supporting a rotor of a rotary machine comprises an axial magnetic bearing unit and a radial magnetic bearing unit mounted directly to one another. One of the axial magnetic bearing unit and the radial magnetic bearing unit is mounted to a support for attachment to a housing of the rotary machine.

20 Claims, 6 Drawing Sheets

Related U.S. Application Data continuation of application No. 16/748,343, filed on Jan. 21, 2020, now Pat. No. 11,209,046.

(51) Int. Cl.
 *H02K 9/16* (2006.01)
 *H02K 9/18* (2006.01)
 *H02K 11/01* (2016.01)
 *H02K 11/21* (2016.01)

(52) U.S. Cl.
 CPC ............. *H02K 9/16* (2013.01); *H02K 9/18* (2013.01); *H02K 11/0141* (2020.08); *H02K 11/21* (2016.01)

(58) Field of Classification Search
 CPC .. F16C 32/047; F16C 37/005; F16C 32/0493; H02K 7/09; H02K 9/16; H02K 9/18; H02K 11/0141; H02K 11/21; F04D 29/058
 USPC .................................................. 310/90.5, 63
 See application file for complete search history.

(56) References Cited

U.S. PATENT DOCUMENTS

| | | | | |
|---|---|---|---|---|
| 5,924,847 | A * | 7/1999 | Scaringe | F04D 29/058 417/42 |
| 6,268,674 | B1 | 7/2001 | Takahashi | |
| 6,707,187 | B1 * | 3/2004 | Gabrys | F16C 32/0442 310/90.5 |
| 6,777,841 | B2 * | 8/2004 | Steinmeyer | F16C 37/005 310/90.5 |
| 6,897,587 | B1 * | 5/2005 | McMullen | H02K 7/09 310/90.5 |
| 8,415,847 | B2 * | 4/2013 | Singhal | F16C 32/047 310/90 |
| 11,209,046 | B2 * | 12/2021 | Vikman | H02K 9/18 |
| 11,592,060 | B2 * | 2/2023 | Vikman | H02K 7/09 |
| 2007/0013241 | A1 | 1/2007 | Schiferl et al. | |
| 2008/0246373 | A1 | 10/2008 | Filatov | |
| 2009/0015012 | A1 | 1/2009 | Metzler et al. | |
| 2009/0201111 | A1 | 8/2009 | Filatov | |
| 2011/0210631 | A1 * | 9/2011 | Siegl | F16C 27/00 310/90.5 |
| 2012/0063918 | A1 * | 3/2012 | de Larminat | F16C 32/0442 417/1 |
| 2014/0191604 | A1 * | 7/2014 | Hawkins | H02K 7/09 310/90.5 |
| 2017/0335889 | A1 * | 11/2017 | Maki-Ontto | H02K 7/09 |
| 2020/0232506 | A1 | 7/2020 | Vikman et al. | |
| 2022/0120317 | A1 * | 4/2022 | Vikman | F16C 37/005 |
| 2023/0235785 | A1 * | 7/2023 | Vikman | H02K 7/09 310/63 |

FOREIGN PATENT DOCUMENTS

| | | |
|---|---|---|
| CN | 105378314 A | 3/2016 |
| CN | 107420423 A | 12/2017 |
| EP | 3249251 A1 | 11/2017 |
| WO | 2004007982 A1 | 1/2004 |
| WO | 2015043881 A1 | 4/2015 |
| WO | 2016087303 A1 | 6/2016 |

OTHER PUBLICATIONS

Filatov, Review: Homopolar Permanent-Magnet-Biased Actuators and Their Application in Rotational Active Magnetic Bearing Systems, 1-25, Dec. 16, 2016, Molecular Diversity Preservation International, www.mdpi.com.

Office Action for Chinese Application No. 202010073122.9, dated Mar. 8, 2022.

* cited by examiner

ACTIVE MAGNETIC BEARING APPARATUS

CROSS-REFERENCE TO RELATED APPLICATIONS

The present application is a continuation of U.S. patent application Ser. No. 17/563,324, filed Dec. 28, 2021 and titled "ACTIVE MAGNETIC BEARING APPARATUS", which is a continuation of U.S. patent application Ser. No. 16/748,343, filed Jan. 21, 2020, now U.S. Pat. No. 11,209,046. U.S. patent application Ser. No. 17/563,324 and U.S. Pat. No. 11,209,046 are herein incorporated by reference in their entireties.

FIELD

The present disclosure concerns active magnetic bearing apparatus, kits of parts for assembling active magnetic bearing apparatus, methods of assembling active magnetic bearing apparatus, rotary machines comprising rotors supported by active magnetic bearing apparatus, and methods of assembling rotary machines.

BACKGROUND

Active magnetic bearing systems are known for supporting the load of a rotor of a rotary machine such as a compressor using magnetic levitation. For example, active magnetic bearing systems are commonly used in high-speed electric motor applications, such as in turbo-compressors. The strength and/or shape of a supporting magnetic field generated by an active magnetic bearing system can be adjusted dynamically in response to sensed changes in the position of a rotor in order to compensate for rotor displacements.

Known active magnetic bearing systems may be axial magnetic bearing systems or radial magnetic bearing systems, dependent on the geometrical arrangements of electromagnetic components. Axial magnetic bearing systems are designed to support the axial load and maintain axial position of a rotor, for example by constraining axial displacement of the rotor. Radial magnetic bearing systems are designed to support the radial load of a rotor, for example by constraining radial displacements of the rotor.

A rotary machine making use of active magnetic bearing systems typically requires both axial magnetic bearing assemblies and radial magnetic bearing assemblies. These active magnetic bearing assemblies can be bulky, complex and difficult to assemble and to integrate into the rotary machine. Due to their complex structure and electrical connections, maintenance or replacement of active magnetic bearings is also complicated and time-consuming.

SUMMARY OF INVENTION

According to a first aspect, there is provided an active magnetic bearing apparatus for supporting a rotor of a rotary machine, the apparatus comprising an axial magnetic bearing unit and a radial magnetic bearing unit mounted directly to one another, wherein one of the axial magnetic bearing unit and the radial magnetic bearing unit is mounted to a support for attachment to a housing of the rotary machine.

It will be appreciated that magnetic bearing apparatus is bearing apparatus for supporting the load of a rotor using magnetic levitation, without physical contact between the bearing apparatus and the rotor. Active magnetic bearing apparatus in particular is magnetic bearing apparatus in which the strength and/or shape of a supporting magnetic field is adjusted dynamically in response to sensed changes in the position of the rotor. Accordingly, active magnetic bearing apparatus makes use of controllable electromagnets, each generally comprising an electrically conducting magnet wire wound into a coil around a ferromagnetic core.

The axial magnetic bearing unit may be configured to support the axial load of the rotor. For example, the axial magnetic bearing unit may be used to constrain (e.g. reduce or minimise) axial displacement of the rotor relative to a reference position, i.e. displacement generally parallel to a longitudinal axis of the rotor. In particular, the axial magnetic bearing unit may be configured to actuate movement of the rotor back towards the reference position when it is displaced axially therefrom.

The radial magnetic bearing unit may be configured to support the radial load of the rotor. For example, the radial magnetic bearing unit may be used to constrain (e.g. reduce or minimise) radial displacement of the rotor relative to a reference position, i.e. displacement generally perpendicular to the longitudinal axis of the rotor. In particular, the radial magnetic bearing unit may be configured to actuate movement of the rotor back towards the reference position when it is displaced radially therefrom.

The rotary machine may be, form part of, or be operatively connected to an electrical machine. The rotary machine may be, form part of, or be operatively connected to a motor or a generator. The rotary machine may, for example, be a compressor or an expander.

The housing may be the housing of the rotary machine which houses (e.g. contains) at least the rotor. The housing may also contain some or all other moving or static parts of the rotary machine.

The apparatus may comprise one or more shielding components for electromagnetically shielding the support and electromagnetic components of the axial magnetic bearing unit and/or the radial magnetic bearing unit from one another. For example, the one or more shielding components may electromagnetically shield the support and electromagnetic components of the axial magnetic bearing unit from one another. Additionally or alternatively, the one or more shielding components may electromagnetically shield the support and electromagnetic components of the radial magnetic bearing unit from one another. Additionally or alternatively, the one or more shielding components may electromagnetically shield electromagnetic components of the radial magnetic bearing unit and electromagnetic components of the axial magnetic bearing from one another.

It will be appreciated that references to a shielding component electromagnetically shielding a first apparatus component from a second apparatus component are references to an electric or magnetic field at the first apparatus component, caused by the presence of the second apparatus component, being reduced by the presence of the shielding component relative to when the shielding component is not present.

For example, the one or more shielding components may reduce leakage of magnetic flux from electromagnetic components of the axial magnetic bearing unit and/or the radial magnetic bearing unit, thereby reducing or preventing electromagnetic interactions (i.e. interference) between the axial magnetic bearing unit and the radial magnetic bearing unit. By reducing or preventing electromagnetic interactions between the axial magnetic bearing unit and the radial magnetic bearing unit, the axial magnetic bearing unit and the radial magnetic bearing unit may be mounted closer together without negatively affecting the functioning of either magnetic bearing unit.

It may be that the support comprises or is formed of an electrically conductive material, for example metal. The support may comprise or be formed from a ferromagnetic metal. For example, the support may comprise or be formed from an iron alloy, such as a steel.

Accordingly, the one or more shielding components reducing leakage of magnetic flux from electromagnetic components of the axial magnetic bearing unit or the radial magnetic bearing unit may reduce electromagnetic interactions between the said magnetic bearing unit and the support. For example, reduction in magnetic flux leakage may reduce or prevent magnetisation of the support or the induction of electric currents in the support and, consequently, the housing of the rotary machine when the active magnetic bearing apparatus is attached thereto by way of the support. The use of one or more shielding components may facilitate use of a support formed from ferromagnetic materials (such as steel), which may be more cost-effective.

The one or more shielding components may comprise a shielding frame. The shielding frame may at least partially surround electromagnetic components of the radial magnetic bearing unit. Additionally or alternatively, the shielding frame may at least partially surround electromagnetic components of the axial magnetic bearing unit.

The shielding frame may be formed from an electrically conducting material. For example, the shielding frame may be a metal frame, such as an aluminium frame.

The shielding frame may be formed from an electrically insulating material. For example, the shielding frame may be formed from glass, polymeric material (e.g. a thermoplastic, thermoset, or elastomer such as rubber) or composite materials such as glass fibre reinforced polymeric material.

The shielding frame may be formed from a non-ferromagnetic material, e.g. a non-ferromagnetic metal. The shielding frame may be formed from a non-magnetic or a paramagnetic material. The shielding frame may be formed from a paramagnetic metal such as aluminium. Use of a non-ferromagnetic material (such as a non-magnetic or paramagnetic material) reduces the transfer of magnetic flux between components.

The one or more shielding components may comprise an auxiliary electromagnetic coil which at least partially surrounds primary electromagnetic bearing components of the axial magnetic bearing unit. The auxiliary electromagnetic coil may be configured to generate an auxiliary magnetic field which opposes a primary magnetic field generated by the primary electromagnetic bearing components, whereby the auxiliary magnetic field compensates for the primary magnetic field.

It will be appreciated that the auxiliary magnetic field opposing the primary magnetic field comprises the auxiliary magnetic field opposing magnetic flux leakage from the primary electromagnetic bearing components.

For example, it may be that the primary electromagnetic bearing components comprise a plurality of primary turns wound from an electrically conductive material (such as copper wire) and that the auxiliary electromagnetic coil comprises a plurality of auxiliary turns wound from an electrically conductive material (such as copper wire) configured such that electric current flows through the plurality of primary turns and the plurality of auxiliary turns in opposing directions. The number of auxiliary turns may be at least half the number of primary turns. The number of auxiliary turns may be at least equal to the number of primary turns.

The auxiliary electromagnetic coil may generate a magneto-motive force (MMF) which reduces (e.g. minimises) magnetic flux leakage from the primary electromagnetic bearing components, for example such that the net MMF of the auxiliary electromagnetic coil and the primary electromagnetic bearing components is approximately zero. The auxiliary magnetic field generated by the auxiliary electromagnetic coil may also cause an increase in the density of magnetic flux along a main flux path in the region of the rotor, thereby allowing the axial magnetic bearing unit to support greater axial loads.

The axial magnetic bearing unit may be of a type which does not require a rotor thrust disk.

The axial magnetic bearing unit may have a ferromagnetic core which comprises a plurality of ferromagnetic core segments electrically insulated from one another. Electrically insulating ferromagnetic core segments may reduce eddy current loops and improve dynamic capabilities of the axial magnetic bearing unit.

The radial magnetic bearing unit may be a heteropolar radial agnetic bearing unit.

The active magnetic bearing apparatus may comprise a position sensor for determining the axial and/or radial position of the rotor. The position sensor may determine the axial and/or radial position of the rotor relative to the axial magnetic bearing unit and/or the radial magnetic bearing unit and/or reference positions.

The location of the position sensor ay be fixed with respect to both magnetic bearing units. The position sensor may be mounted to the support. The position sensor may be mounted to the axial magnetic bearing unit or the radial magnetic bearing unit. The position sensor may be mounted directly between the support and the magnetic bearing unit mounted on the support. The position sensor may be mounted between the magnetic bearing units. The position sensor may be mounted to the magnetic bearing unit which is directly mounted on the support. The position sensor may be mounted to the magnetic bearing unit which is not directly mounted on the support (i.e. the magnetic bearing unit which is mounted on the magnetic bearing unit which is mounted directly on the support). The position sensor may form part of the radial magnetic bearing unit or the axial magnetic bearing unit. There may be two or more such position sensors. The radial magnetic bearing unit may comprise an integrated position sensor. Additionally or alternatively, the axial magnetic bearing unit may comprise an integrated position sensor.

The active magnetic bearing apparatus may further comprise a speed sensor for determining a speed at which the rotor moves. The speed sensor may be configured to determine the rotational speed of the rotor (e.g. the rotational speed at which the rotor is driven by an electric motor). The location of the speed sensor may be fixed with respect to both magnetic bearing units. The speed sensor may be mounted to the support. The speed sensor may be mounted to the axial magnetic bearing unit or the radial magnetic bearing unit. The speed sensor may be mounted directly between the support and the magnetic bearing unit mounted on the support. The speed sensor may be integrated with the position sensor. For example, the position sensor may be a position and speed sensor.

The active magnetic bearing apparatus may comprise a fluid cooling channel. The fluid cooling channel may extend transversely through the apparatus (e.g. substantially along a direction or substantially in a plane normal to the axis). For example, it may be that at least part of the fluid cooling channel extends radially through the apparatus. It may be that the fluid cooling channel extends through one of the axial magnetic bearing unit and the radial magnetic bearing unit. Alternatively, it may be that the fluid cooling channel extends adjacent one of the axial magnetic bearing unit and the radial magnetic bearing unit. It may be that the fluid cooling channel extends through or adjacent the position sensor. The active magnetic bearing apparatus may comprise a plurality of such fluid cooling channels. One or more of the plurality of fluid cooling channels may extend through or adjacent the axial magnetic bearing unit, the radial magnetic bearing unit and/or the position sensor.

The active magnetic bearing apparatus may comprise a fluid mover for generating a flow of a cooling fluid through the or each fluid cooling channel. The fluid mover may be an air mover for generating a flow of cooling air through the or each fluid cooling channel. The fluid mover may be configured to generate the flow of the cooling fluid (e.g. cooling air) such that it flows transversely through the apparatus from a lower side to an upper side of the apparatus. The fluid mover may be a fan. The apparatus may comprise a fluid (e.g. air) discharge port on the upper side.

The support may comprise or be a support plate. The support may be substantially disc-shaped. The support may be substantially annular. The support may have a central aperture for receiving an end of the rotor. The support may function as an end shield for the active magnetic bearing apparatus. The support may function as an end shield for the rotary machine.

It may be that the axial magnetic bearing unit and the radial magnetic bearing unit are mounted to a first side of the support. The first side of the support may be an inwards-facing side of the support (e.g. an inwards-facing side of the end shield), that is to say a side of the support which faces towards the centre of the rotor when assembled for use.

It may be that external electrical connectors (for example, for connection to a power supply) for the axial magnetic bearing unit and/or the radial magnetic bearing unit are provided on an opposing second side of the support. The second side of the support may be outwards-facing side of the support (e.g. an outwards-facing side of the end shield), that is to say a side of the support which faces away from the centre of the rotor when assembled for use.

One or more channels (i.e. feedthroughs) may extend through the support between the first and second sides, for example for housing wiring connecting the axial magnetic bearing unit and/or the radial magnetic bearing unit with the external electrical connectors. It may be that at least first and second channels (i.e. feedthroughs) extend through the support between the first and second sides, the first channel being configured to house wiring to supply power to the axial magnetic bearing unit; the radial magnetic bearing unit, the position sensor and/or the speed sensor, and the second channel being configured to house wiring to transmit measurement signals from the position sensor and/or the speed sensor to a control unit. Separation of power supply and measurement signal transmission wiring typically reduces electromagnetic interactions between the wiring which might degrade the measurement signal transmission. Providing the external electrical connectors on the second side of the support may simplify connection of the axial magnetic bearing unit and/or the radial magnetic bearing unit to the power supply.

It may be that the active magnetic bearing apparatus comprises an auxiliary mechanical bearing unit, for example an auxiliary ball bearing unit. The auxiliary mechanical bearing unit may be mounted to the second side of the support. Providing the auxiliary mechanical bearing unit on the second side of the support may facilitate servicing or replacement of said auxiliary mechanical bearing unit.

It may be that the radial magnetic bearing unit is mounted to the support and the axial magnetic bearing unit is mounted directly to the radial magnetic bearing unit. It may be that the axial magnetic bearing unit is not mounted directly to the support but is instead mounted to the support by way of the radial magnetic bearing unit. Alternatively; it may be that the axial magnetic bearing unit is mounted to the support and the radial magnetic bearing unit is mounted directly to the axial magnetic bearing unit. It may be that the radial magnetic bearing unit is not mounted directly to the support but is instead mounted to the support by way of the axial magnetic bearing unit.

According to a second aspect, there is provided a kit of parts for assembling an active magnetic bearing apparatus according to the first aspect, the kit of parts comprising: an axial magnetic bearing unit and a radial magnetic bearing unit configured for mounting directly to one another; and a support; wherein one of the axial magnetic bearing unit and the radial magnetic bearing unit is configured to be mounted to the support for attachment to a housing of a rotary machine. The kit of parts may further comprise a position sensor and/or a speed sensor.

The components of the kit of parts (i.e. the axial magnetic bearing unit, the radial magnetic bearing unit and the support) may be configured to cooperate to provide any of the features recited herein with respect to the first aspect.

According to a third aspect; there is provided a method of assembling an active magnetic bearing apparatus, the method comprising: mounting an axial magnetic bearing unit and a radial magnetic bearing unit directly together: and mounting one of the axial magnetic bearing unit and the radial magnetic bearing unit to a support.

By mounting the axial magnetic bearing unit and the radial magnetic bearing unit directly together, and by mounting one of the axial magnetic bearing unit and the radial magnetic bearing unit to the support, the process of adjusting any internal clearances between components of the active magnetic bearing apparatus (for example, by shimming) is made easier and faster compared to active magnetic bearing systems comprising separate axial and radial magnetic bearing apparatus.

The steps of the method may be carried out in any order. For example; it may be the method comprises: first, mounting an axial magnetic bearing unit and a radial magnetic bearing unit directly together; and, second, mounting one of the axial magnetic bearing unit and the radial magnetic bearing unit to the support. Alternatively, it may be that the method comprises: first, mounting one of the axial magnetic bearing unit and the radial magnetic bearing unit to the support; and, second, mounting the axial magnetic bearing unit and the radial magnetic bearing unit directly together. It may be that the steps of mounting the axial magnetic bearing unit and the radial magnetic bearing unit directly together and of mounting one of the axial magnetic bearing unit and the radial magnetic bearing unit to the support are carried out concurrently, i.e. at the same time.

The method may comprise: mounting the radial magnetic bearing unit to the support; and mounting the axial magnetic bearing unit directly to the radial magnetic bearing unit. Alternatively, the method may comprise: mounting the axial magnetic bearing unit to the support; and mounting the radial magnetic bearing unit directly to the axial magnetic bearing unit.

The method may further comprise: mounting a position sensor to the support, the axial magnetic bearing unit and/or the radial magnetic bearing unit. For example, the method may comprise: mounting the position sensor between the support and the magnetic bearing unit mounted on the support.

According to a fourth aspect, there is provided a method of assembling a rotary machine, the method comprising: providing a first active magnetic bearing apparatus according to the first aspect; and inserting a first end of a rotor into the first magnetic bearing apparatus such that a first axial bearing region of the rotor aligns with the axial magnetic bearing unit of the first magnetic bearing apparatus and a first radial bearing region of the rotor aligns with the radial magnetic bearing unit of the first magnetic bearing apparatus.

It may be that the first magnetic bearing apparatus defines a complete annulus surrounding the first end of the rotor during the insertion. That is to say, it may be that the first magnetic bearing apparatus extends wholly around the first end of the rotor during the insertion.

The method may further comprise: providing a second active magnetic bearing apparatus according to the first aspect; and inserting a second end of the rotor into the second magnetic bearing apparatus such that a second axial bearing region of the rotor aligns with the axial magnetic bearing unit of the second active magnetic bearing apparatus and a second radial bearing region of the rotor aligns with the radial magnetic bearing unit of the second active magnetic bearing apparatus.

It may be that the second magnetic bearing apparatus defines a complete annulus surrounding the second end of the rotor during the insertion. That is to say, it may be that the second magnetic bearing apparatus extends wholly around the second end of the rotor during the insertion.

According to a fifth aspect, there is provided a rotary machine comprising a rotor supported by at least one active magnetic bearing apparatus, wherein (a) the at least one active magnetic bearing apparatus is an active magnetic bearing apparatus according to the first aspect and/or (b) the rotary machine is assembled according to a method in accordance with the third aspect. The rotary machine may be, form part of, or be operatively connected to an electrical machine. The rotary machine may be, form part of, or be operatively connected to a motor or a generator. The rotary machine may, for example, be a compressor or an expander.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

FIGURES

Embodiments will now be described by way of example only, with reference to the Figures, in which.

DETAILED DESCRIPTION

With reference to FIGS. 1, 2, 3 and 4, an active magnetic bearing module 1 includes a steel support frame 2, a radial magnetic bearing unit 3 and an axial magnetic bearing unit 4.

Figure 1:
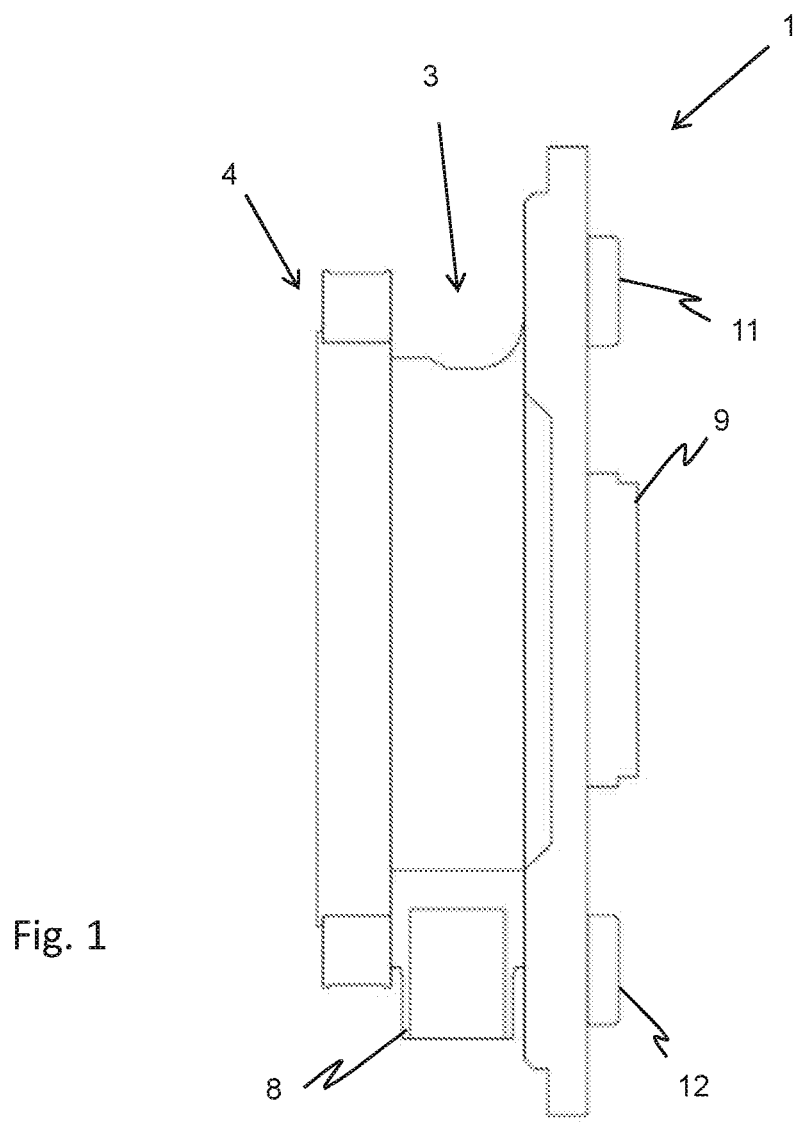
FIG. 1 is an assembled active magnetic bearing module viewed in cross-section.
Figure 2:
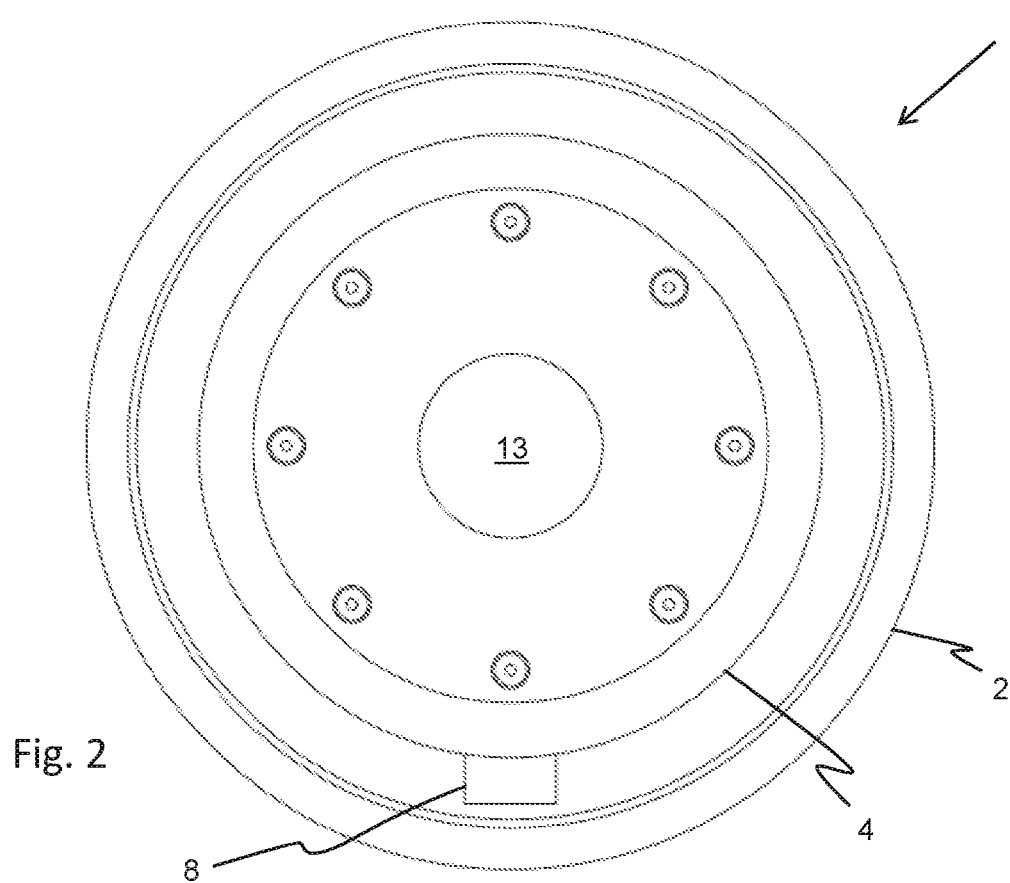
FIG. 2 is an inside view of the assembled active magnetic bearing module of FIG. 1.
Figure 3:
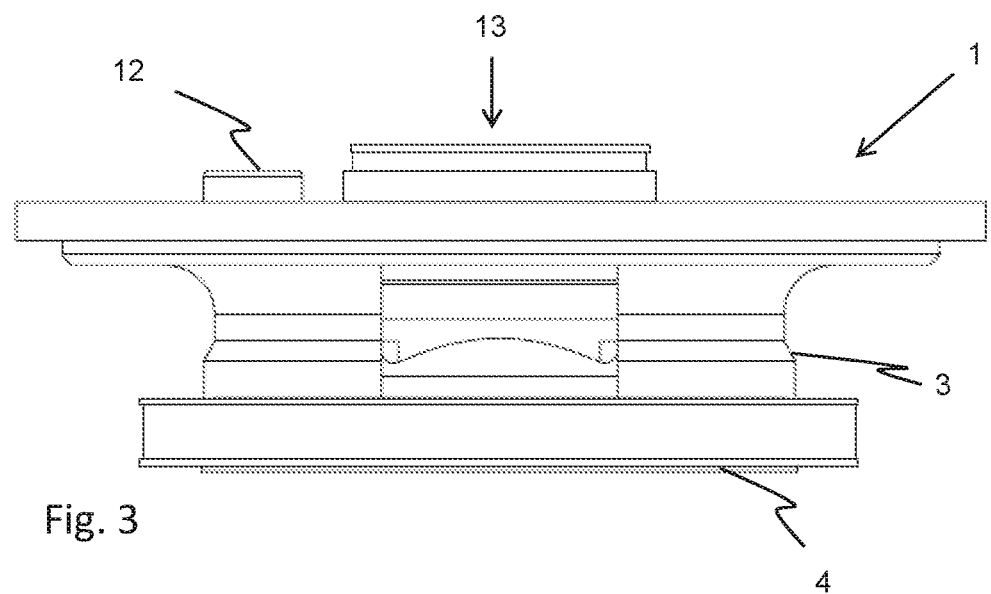
FIG. 3 is a side view of the assembled active magnetic bearing module of FIG. 1.
Figure 4:
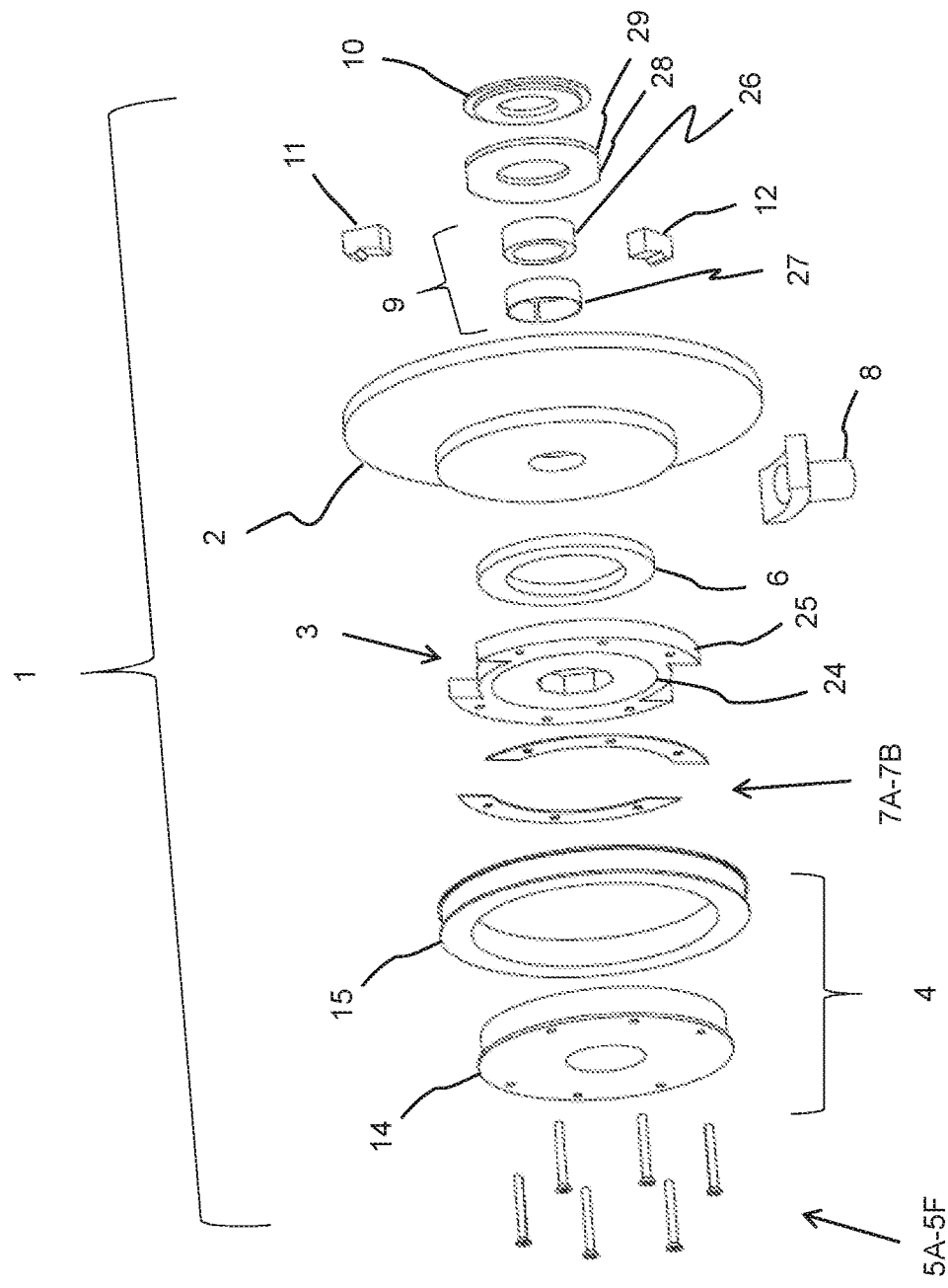
FIG. 4 is an exploded view of the disassembled components of the active magnetic bearing module of FIG. 1.

When assembled, the radial and axial magnetic bearing units 3 and 4 are mounted to the steel support frame 2 by bolts 5A-5F (FIG. 4). A position sensor 6 is mounted between the radial magnetic bearing unit 3 and the steel support frame 2. In the embodiment shown in FIGS. 1 to 4, shims 7A and 7B are provided between the axial magnetic bearing unit 4 and the radial magnetic bearing unit 3. However, it will be appreciated that shims are not necessarily present in all possible embodiments of the invention. A cooling air inlet nozzle 8 is attached to a periphery of the radial magnetic bearing unit 3. The cooling air inlet nozzle 8, the position sensor 6, the radial magnetic bearing unit 3 and the axial magnetic bearing unit 4 are all provided on a first side of the generally disc-shaped steel support frame 2.

An auxiliary bearing unit 9, a brush seal 10, a power connector 11 and a sensor connector 12 are mounted on a second side of the steel support frame 2 opposite the first side.

A central aperture 13 extends through the steel support frame 2. All of the axial magnetic bearing unit 4, the radial magnetic bearing unit 3, the position sensor 6, the auxiliary bearing unit 9 and the brush seal 10 are generally annular in shape and therefore include a central aperture which aligns with the central aperture 13 of the steel support frame 2 when assembled. The active magnetic bearing module 1 is therefore designed to receive a rotor of a rotary machine, whereby one end of the rotor extends into and through central aperture 13 of the magnetic bearing module 1 in use.

The axial magnetic bearing unit 4 includes an inner axial magnetic bearing 14 surrounded by an outer auxiliary coil 15. The inner axial magnetic bearing 14 contains electromagnetic components configured to generate a controllable magnetic field for supporting the axial load of a rotor inserted into the active magnetic bearing module 1. The outer auxiliary coil 15 includes copper windings arranged to generate a magnetic field, when current flows through the outer auxiliary coil 15, which opposes the magnetic field generated by the electromagnetic components of the inner axial magnetic bearing 4, thereby reducing or preventing leakage of magnetic flux from the inner axial magnetic bearing 14 into surrounding components of the active magnetic bearing module 1.

Figure 5:
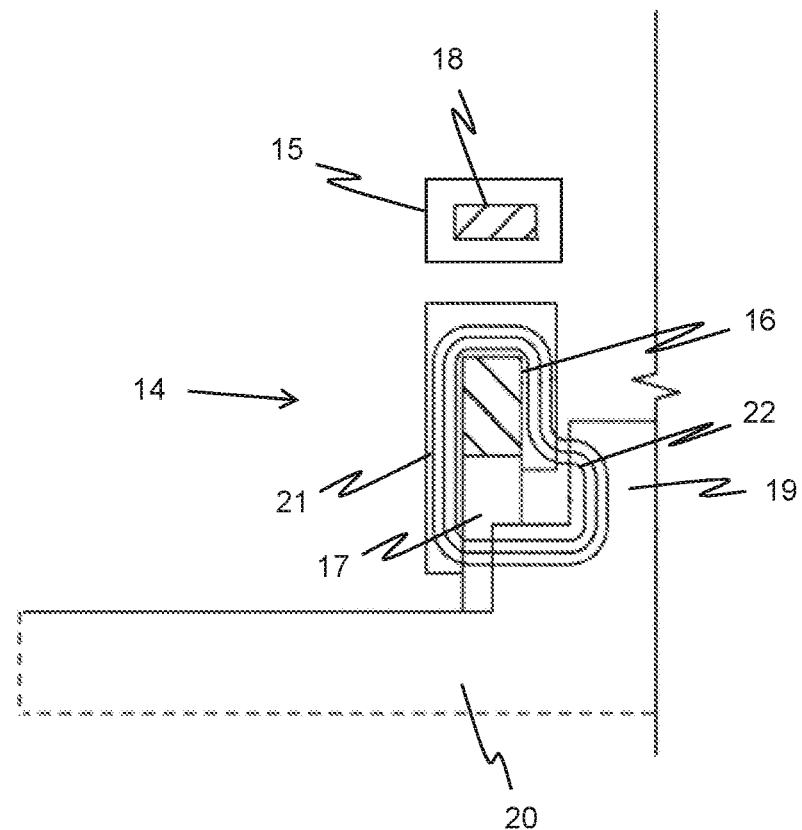
FIG. 5 is a schematic cross-section through a portion of an active magnetic bearing system and a rotor.

For example, FIG. 5 illustrates schematically the structure and operation of the axial magnetic bearing unit 4. The inner axial magnetic bearing 14 includes a primary winding of copper wire 16 wound around a magnetic core 17, and the outer auxiliary coil 15 includes a secondary winding of copper wire 18. The primary and secondary windings 16 and 18 are wound in opposing directions so that, in use, an electric current flows through the primary and secondary windings in opposite directions. Both the primary and secondary windings 16 and 18 are wound through approximately the same number of turns. The inner axial magnetic bearing 4 is provided immediately adjacent a shoulder portion 19 of the rotor 20. In such a configuration, the majority of magnetic flux 21 (represented by spaced-apart, curved flux lines) generated by operation of the inner axial magnetic bearing 4 flows along a main magnetic flux path 22 through the shoulder portion 19 of the rotor 20. By controlling the current though the primary and secondary windings 16 and 18, the strength of the bearing thrust force acting on the rotor can be varied such that the axial displacement of the rotor can be controlled. The presence of the secondary winding 18 in the outer auxiliary coil 15 increases the density of magnetic flux along the main flux path 22, thereby increasing the load capacity of the axial magnetic bearing unit 4. In addition, because the currents in the primary and secondary windings 16 and 18 flow in opposing directions, leakage of magnetic flux from the primary electromagnetic components to the surrounding components of the active magnetic bearing module 1 is reduced. In fact, the net magneto-motive force (MMF) of the axial magnetic bearing unit 4 can be reduced to zero (or close to zero) by operation of the outer auxiliary coil 15.

The radial magnetic bearing unit 3 includes an inner radial magnetic bearing 24 surrounded by an aluminium shielding frame 25. The inner radial magnetic bearing 24 may contain any arrangement of electromagnetic components known in the art for supporting the radial load of the rotor. The aluminium shielding frame 25 reduces leakage of magnetic flux from the inner radial magnetic bearing 24 to surrounding components of the active magnetic bearing module 1.

The position sensor 6 and controller are configured to determine the position of the rotor relative to the locations of the axial and radial magnetic bearing units 3 and 4. This is achieved by sensing movements of the rotor along two different radial directions and along an axial direction. The position sensor 6 is connected to a controller (not shown) also in communication with the axial and radial magnetic units 3 and 4. The controller is programmed to detect, based on outputs from the position sensor 6, axial or radial displacements of the rotor from a neutral position and to control operation of the axial and radial magnetic units 3 and 4 to compensate for those axial or radial displacements. The position sensor may be of any suitable type known to a person of skill in the art. For example, the position sensor may be an inductive, eddy-current, capacitive or optical position sensor.

The auxiliary bearing unit 9 includes an angular contact auxiliary ball bearing 26, a damping ribbon 27 and a cover 28 with a volute seal 29 attached thereto. The angular contact auxiliary ball bearing 26 is arranged such that the rotor only comes into contact with ball bearings when subject to loads which exceed the bearing capacity of the axial and radial magnetic bearing units or when the active magnetic bearing module, and the associated rotary machine in which it is installed, are powered down.

In this embodiment, the volute seal 29 enables tight attachment of the active magnetic bearing module 1 to a volute of a turbo compressor. However, it will be appreciated that in alternative embodiments, for example where the active magnetic bearing module is used to support the rotor of a different type of rotary machine, the volute seal 29 may not be present.

The brush seal 10 inhibits back flow of fluid from the rotary machine (e.g. the compressor), in which the active magnetic bearing module 1 is installed, into the active magnetic module itself. It will be appreciated that, in alternative embodiments, the brush seal may not be present.

Power supply, measurement signal and control signal wiring for the axial magnetic bearing unit 4, the radial magnetic bearing unit 3 and the position sensor 6 extends through channels (i.e. cable feedthroughs) in the steel support frame 2 from the first side to the second side where the power and sensor connectors 11 and 12 are provided. The power supply, measurement signal and control signal wiring may be separated into different channels to reduce electromagnetic interactions between the wiring.

Figure 6:
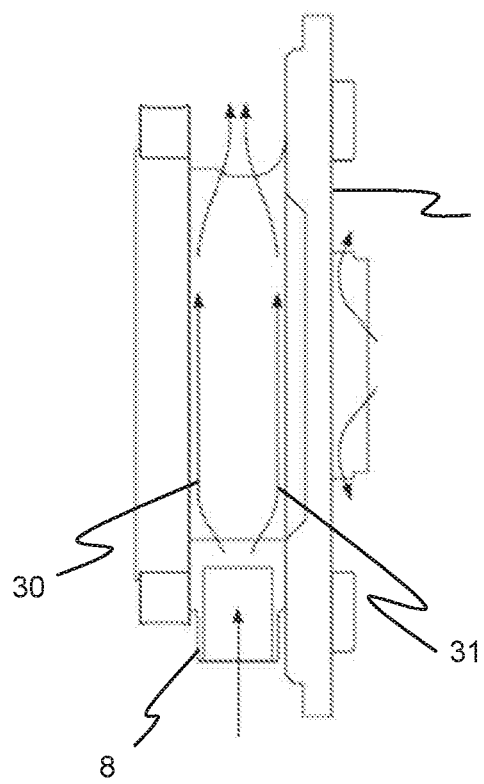
FIG. 6 is a cross-section through the assembled active magnetic bearing module of FIG. 1 showing cooling air flow paths.

As shown in FIG. 6, radial air cooling channels 30 and 31 extend transversely through the active magnetic bearing module 1 from the cooling air inlet nozzle 8, provided on a lower side of the module, to an upper side of the module. Air cooling channel 30 extends transversely between the axial magnetic bearing unit 4 and the radial magnetic bearing unit 3, between the shims 7A and 7B. Air cooling channel 31 extends transversely between the radial magnetic bearing unit 3 and the position sensor, as well as through open portions of the position sensor itself. In use, the cooling air inlet nozzle 8 is connected to an air mover, such as a fan, for blowing cooling air through the air cooling channels 30 and 31.

The electromagnetic shielding between the axial magnetic bearing unit 4, the radial magnetic bearing unit 3 and the steel support frame 2 provided by the auxiliary coil 15 and the aluminium support frame 25 permits the axial and radial magnetic bearing units to be mounted closely together, and to the steel support frame, thereby enabling a particularly compact structure. This is also assisted by the cooling provided by the radial air cooling channels.

Figure 7:
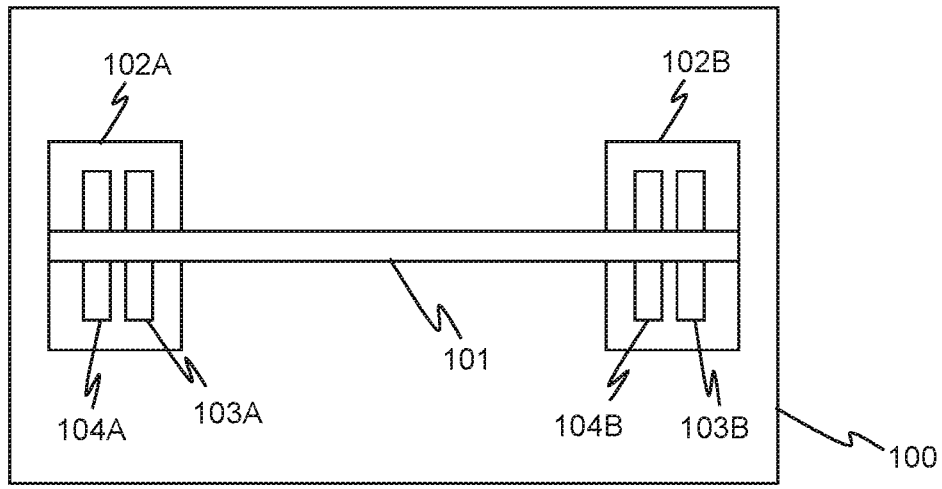
FIG. 7 is a schematic cross-section through a rotary machine having a rotor supported at first and second ends by active magnetic bearing modules.

The compact active magnetic bearing module 1 can be readily integrated into a rotary machine, such as a compressor. For example, FIG. 7 illustrates schematically how a rotor 101 of a rotary machine 100 is supported at first and second ends by first and second active magnetic bearing modules 102A and 102B, each module containing respective axial magnetic bearing units 103A, 103B and radial magnetic units 104A, 104B.

The active magnetic bearing modules are typically installed such that the first side of each steel support frame faces towards the centre of the rotor while the second side of each steel support frame faces away from the centre of the rotor. Accordingly, the first side of the support frame is an "inwards-facing" or "inner" side of the support frame and the second side of the support frame is an "outwards-facing" or "outer" side of the support frame. Since power supply and sensor connectors are provided on the second side of each steel support frame, connecting the axial magnetic bearing units, the radial magnetic bearing units and the position sensors to a power supply or to a controller is relatively simple and fast. It is also easy to carry out maintenance on these electrical connectors without disassembling the entire active magnetic bearing modules. Similarly, providing the auxiliary bearing units on the second, externally-facing sides of the steel support frames simplifies maintenance or replacement without disassembly of the active magnetic bearing modules.

Figure 8:
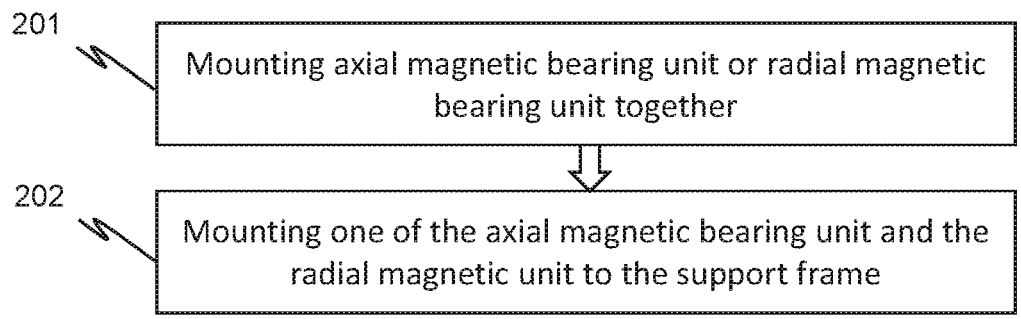
FIG. 8 is a flow chart illustrating a method of assembling an active magnetic bearing module.

A simplified method of assembling an active magnetic bearing module 1 is illustrated in a flow diagram in FIG. 8.

Figure 9:
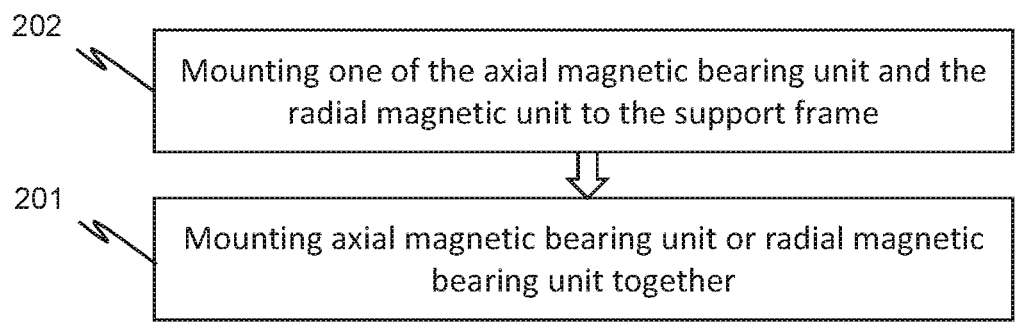
FIG. 9 is a flow chart illustrating a method of assembling an active magnetic bearing module.

In block 201, an axial magnetic bearing unit and a radial magnetic bearing unit are mounted directly together, for example by way of bolts. In block 202, one of the axial magnetic bearing unit and the radial magnetic bearing unit is mounted to a steel support frame, for example by way of bolts. As can be seen in FIG. 9, the method steps 201 and 202 may also be carried out in the opposite order. In fact, the order in which the steps is carried out is not important. For example, the method steps may be carried out concurrently, for example by stacking the axial magnetic bearing unit, the radial magnetic bearing unit and steel support frame, and mounting all three components to one another at the same time, for example by way of bolts.

Figure 10:
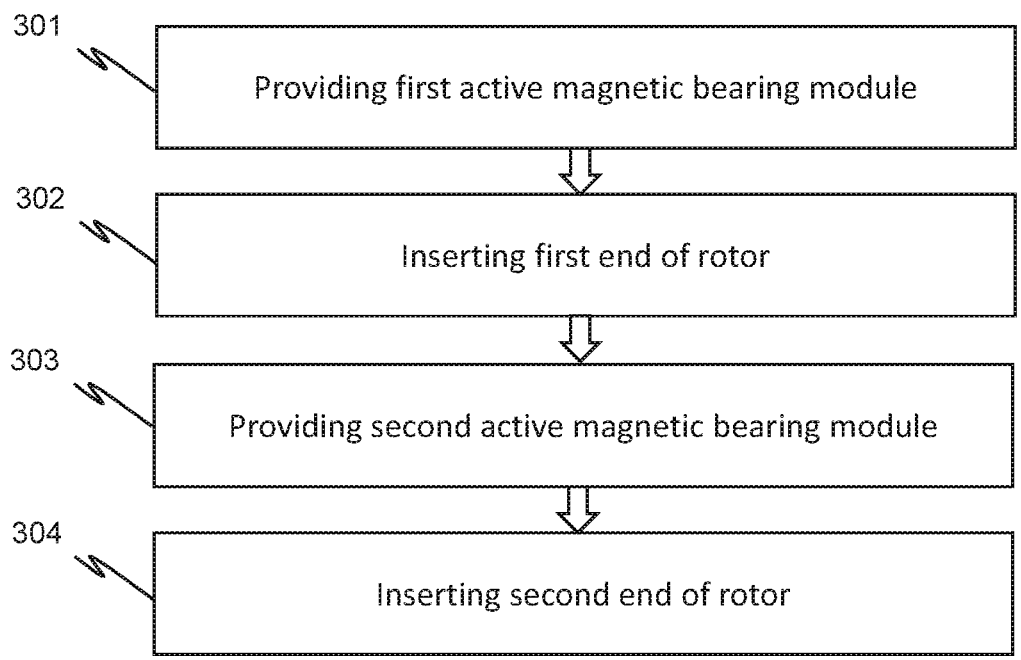
FIG. 10 is a flow chart illustrating a method of assembling a rotary machine.

A simplified method of assembling a rotary machine 100 is illustrated in a flow diagram in FIG. 10. In block 301, a first active magnetic bearing module is provided or assembled. In block 302, a first end of a rotor is inserted into the first magnetic bearing module such that a first axial bearing region of the rotor aligns with the axial magnetic bearing unit of the first active magnetic bearing module and a first radial bearing region of the rotor aligns with the radial magnetic bearing unit of the first active magnetic bearing module. In block 303, a second active magnetic bearing module is provided or assembled. In block 304, a second end of the rotor is inserted into the second active magnetic bearing module such that a second axial bearing region of the rotor aligns with the axial magnetic bearing unit of the second active magnetic bearing module and a second radial bearing region of the rotor aligns with the radial magnetic bearing unit of the second active magnetic bearing module.

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An active magnetic bearing apparatus for supporting a rotor of rotary machine, the apparatus comprising:
    an axial magnetic bearing unit for supporting an axial load of the rotor;
    a radial magnetic bearing unit for supporting a radial load of the rotor, the radial magnetic bearing unit including an inner radial magnetic bearing; and
    an auxiliary bearing unit for supporting loads exceeding a load capacity of one of the axial magnetic bearing unit or the radial magnetic bearing unit;
    wherein the radial magnetic bearing unit is mounted directly to the axial magnetic bearing unit, and wherein the axial magnetic bearing unit is mounted to a support frame plate, the support frame plate configured to be removably connected to a housing of the rotary machine.

2. The active magnetic bearing apparatus of claim 1, wherein the axial magnetic bearing unit includes an inner axial magnetic bearing surrounded by an outer auxiliary coil, the inner axial bearing including a primary winding of wire wound a magnetic core, and the outer auxiliary coil including a secondary winding of wire.

3. The active magnetic bearing apparatus of claim 2, wherein the primary winding of wire and the secondary winding of wire are wound in opposing directions.

4. The active magnetic bearing apparatus of claim 2, wherein a shielding frame reduces leakage of magnetic flux from the inner radial magnetic bearing to the support frame and electromagnetic components of the axial magnetic bearing unit.

5. The active magnetic bearing apparatus according to claim 1, wherein the apparatus comprises a position sensor for determining one of an axial or a radial position of the rotor.

6. The active magnetic bearing apparatus according to claim 1, wherein the apparatus comprises a fluid cooling channel for cooling the axial magnetic bearing unit and the radial magnetic bearing unit, the fluid cooling channel extending transversely through the active magnetic bearing apparatus and extending between the axial magnetic bearing unit and the radial magnetic bearing unit.

7. The active magnetic bearing apparatus according to claim 6, wherein the fluid cooling channel extends from a cooling fluid inlet nozzle provided on a first side of the active magnetic bearing apparatus to a second side of the active magnetic bearing apparatus opposite the first side of the active magnetic bearing apparatus.

8. The active magnetic bearing apparatus according to claim 6, wherein the fluid cooling channel extends through or adjacent one of the axial magnetic bearing unit and the radial magnetic bearing unit.

9. The active magnetic bearing apparatus according to claim 6 further comprising a fluid mover for generating a flow of a cooling fluid through the cooling channel, wherein the fluid mover is connected to the cooling fluid inlet nozzle.

10. The active magnetic bearing apparatus according to claim 1, wherein the auxiliary bearing unit includes an angular contact auxiliary ball bearing and a damping ribbon.

11. The active magnetic bearing apparatus according to claim 1, wherein the auxiliary bearing unit includes a brush seal configured to inhibit back flow of fluid from the rotary machine into the active magnetic bearing apparatus.

12. A rotary machine comprising:
    a housing;
    an active magnetic bearing apparatus arranged in the housing and configured to support a rotor of the rotary machine, the active magnetic bearing apparatus including:
        a support frame plate configured to be removably connected to the housing;
        an axial magnetic bearing unit for supporting an axial load of the rotor;
        a radial magnetic bearing unit for supporting a radial load of the rotor, the radial magnetic bearing unit including an inner radial magnetic; and
        an auxiliary bearing unit for supporting loads exceeding a load capacity of one of the axial magnetic bearing unit or the radial magnetic bearing unit;
        wherein the radial magnetic bearing unit is mounted directly to the axial magnetic bearing unit, and wherein the axial magnetic bearing unit is mounted to the support frame plate.

13. The rotary machine of claim 12, wherein the axial magnetic bearing unit includes an inner axial magnetic bearing surrounded by an outer auxiliary coil, the inner axial bearing including a primary winding of wire wound a magnetic core, and the outer auxiliary coil including a secondary winding of wire.

14. The rotary machine of claim 13, wherein the primary winding of wire and the secondary winding of wire are wound in opposing directions.

15. The rotary machine of claim 12, wherein a shielding frame reduces leakage of magnetic flux from the inner radial magnetic bearing to the support frame and electromagnetic components of the axial magnetic bearing unit.

16. The rotary machine of claim 12, wherein the apparatus comprises a position sensor for determining one of an axial or a radial position of the rotor.

17. The rotary machine of claim 12, wherein the apparatus comprises a fluid cooling channel for cooling the axial magnetic bearing unit and the radial magnetic bearing unit, the fluid cooling channel extending transversely through the active magnetic bearing apparatus and extending between the axial magnetic bearing unit and the radial magnetic bearing unit.

18. The rotary machine of claim 17, further comprising a fluid mover for generating a flow of a cooling fluid through the cooling channel.

19. The rotary machine of claim 12, wherein the auxiliary bearing unit includes an angular contact auxiliary ball bearing and a damping ribbon.

20. The rotary machine of claim 12, wherein the auxiliary bearing unit includes a brush seal configured to inhibit back flow of fluid from the rotary machine into the active magnetic bearing apparatus.

\* \* \* \* \*